US011311140B1

(12) United States Patent
Churchill et al.

(10) Patent No.: US 11,311,140 B1
(45) Date of Patent: Apr. 26, 2022

(54) KOMBUCHA BREWING DEVICE

(71) Applicant: Kombu LLC, San Francisco, CA (US)

(72) Inventors: Michael John Evans Churchill, San Francisco, CA (US); Natalia Amijo, San Francisco, CA (US)

(73) Assignee: Kombu LLC, San Francisco, CA (US)

( * ) Notice: Subject to any disclaimer, the term of this patent is extended or adjusted under 35 U.S.C. 154(b) by 0 days.

(21) Appl. No.: 17/516,471

(22) Filed: Nov. 1, 2021

(51) Int. Cl.
*A47J 31/52* (2006.01)
*A23F 3/16* (2006.01)
(52) U.S. Cl.
CPC ........... *A47J 31/5253* (2018.08); *A23F 3/166* (2013.01); *A47J 31/521* (2018.08)
(58) Field of Classification Search
CPC .... A47J 31/46; A47J 31/3633; A47J 31/4482; A47J 31/407; A47J 31/56; A47J 31/369; A47J 31/368; A47J 31/005; A47J 31/521; A47J 31/4435; A47J 31/5253
USPC .................. 99/280, 281, 282, 283, 284, 295
See application file for complete search history.

(56) References Cited

U.S. PATENT DOCUMENTS

2010/0154645 A1* 6/2010 Nosler .................... A47J 31/36
99/299
2015/0359380 A1* 12/2015 Oleksy .................. A47J 31/462
426/433

* cited by examiner

*Primary Examiner* — Phuong T Nguyen
(74) *Attorney, Agent, or Firm* — Kenyon Jenckes

(57) ABSTRACT

A kombucha brewing device includes two brewing chambers; a first stage (F1) fermentation chamber, and second stage (F2) fermentation chamber. A lid covers both chambers, and may include a first portion for the F1 chamber and a second portion for the F2 portion. The F1 portion of the lid may include a gasket and removable fabric cover insert. A base containing both chambers may include separate or segmented heating elements and temperature sensors associated with each chamber. A temperature controller may maintain the first chamber within a first temperature range and maintain the second chamber within a second temperature range by monitoring information from the temperature sensors and activating and de-activating the heating elements as appropriate.

12 Claims, 15 Drawing Sheets

KOMBUCHA BREWING DEVICE

TECHNICAL FIELD

The technical field of the disclosed embodiments relate to brewing kombucha. More particularly, the disclosed embodiments relate to a device for home-brewing kombucha in a simple, organized, and controlled manner.

BACKGROUND

Kombucha is a fermented, lightly effervescent, sweetened black or green tea drink. Kombucha may be produced by introducing a symbiotic culture of bacteria and yeast (SCOBY) to a sweetened tea base, and brewing the mixture in an appropriate environment.

The microbial populations in a SCOBY may vary. The yeast component may include, for example, *Saccharomyces cerevisiae*, and the bacterial component may include, for example, *Gluconacetobacter xylinus*, although other species of yeast and/or bacteria may be included and/or substituted.

Kombucha may be fermented in two stages. In a first stage, tea leaves may be steeped in a hot sugar/water mixture and placed in a sterilized container (or steeped in water, with sugar added later). After the tea is sufficiently cooled, the SCOBY culture may be introduced. The container may be covered with some sort of breathable material, e.g., a paper towel or breathable fabric, to prevent contamination.

In a second stage, the partially fermented kombucha may be sealed in fermenting containers, for example, glass or plastic bottles, to complete fermentation and encourage and contain carbonation.

Due to the typical do-it-yourself (DIY) nature of home-brewing kombucha, the setups used by home-brew kombucha makers may provide less than ideal conditions for the fermentation process and negatively affect the carbonation and flavor of the end product. In addition, separate setups for the different stages of brewing kombucha may take up too much kitchen space and have the potential to create a mess, especially when changing containers between the first and second stage fermentations.

Two major components of brewing kombucha are temperature during fermentation, and timing the fermentation stages. Temperature fluctuations during either fermentation stage may affect the carbonation level, which may result in an undesirably flat kombucha. Also, improper temperature control can result in a lack of flavor.

To keep a constantly warm temperature during fermentation, makers have used heat pads or wraps. A problem with these pads is that many do not provide a specific temperature setting. Also, keeping track of fermentation times is typically done manually, for example, by writing dates on tape affixed to the bottles. This technique requires makers to manually check dates to see when fermentation is finished. Inattention to any of these details may result in an undesirable batch of kombucha, wasting time and resources, and ultimately frustrating the kombucha home-brewer.

SUMMARY

In an embodiment, a kombucha brewing device includes two brewing chambers; a first stage (F1) fermentation chamber, and second stage (F2) fermentation chamber. A lid covers both chambers, and may include a first portion for the F1 chamber and a second portion for the F2 portion. The F1 portion of the lid may include a gasket and removable fabric cover insert.

A base containing both chambers may include separate or segmented heating elements and temperature sensors associated with each chamber. A temperature controller may maintain the first chamber within a first temperature range and maintain the second chamber within a second temperature range by monitoring information from the temperature sensors and activating and de-activating the heating elements as appropriate.

The device may include a modem and associated antenna. A controller may transmit and receive information from a user device. This may include transmitting current temperature and timer status for each chamber to the user device, and receiving updated temperature and timer information entered by the user.

The device may include a speaker and LED displays to provide audible and visual indications on the device itself.

DETAILED DESCRIPTION

Figure 1:
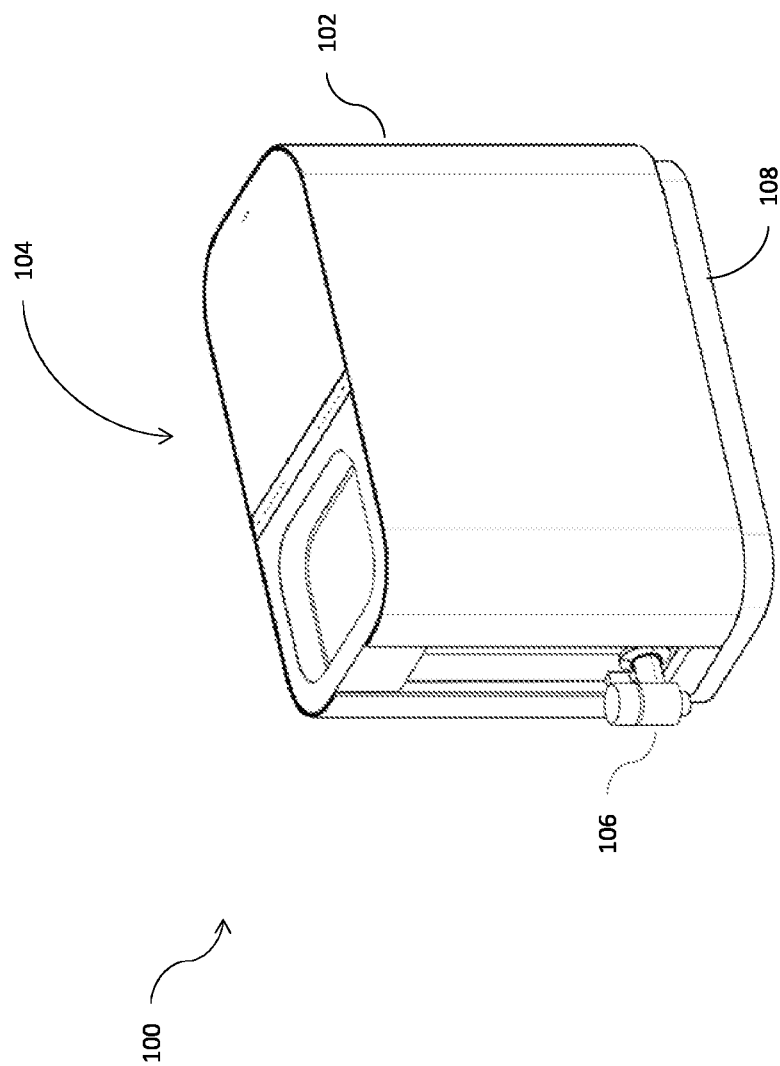
FIG. 1 is a perspective view of a kombucha brewing device according to an embodiment.
Figure 2:
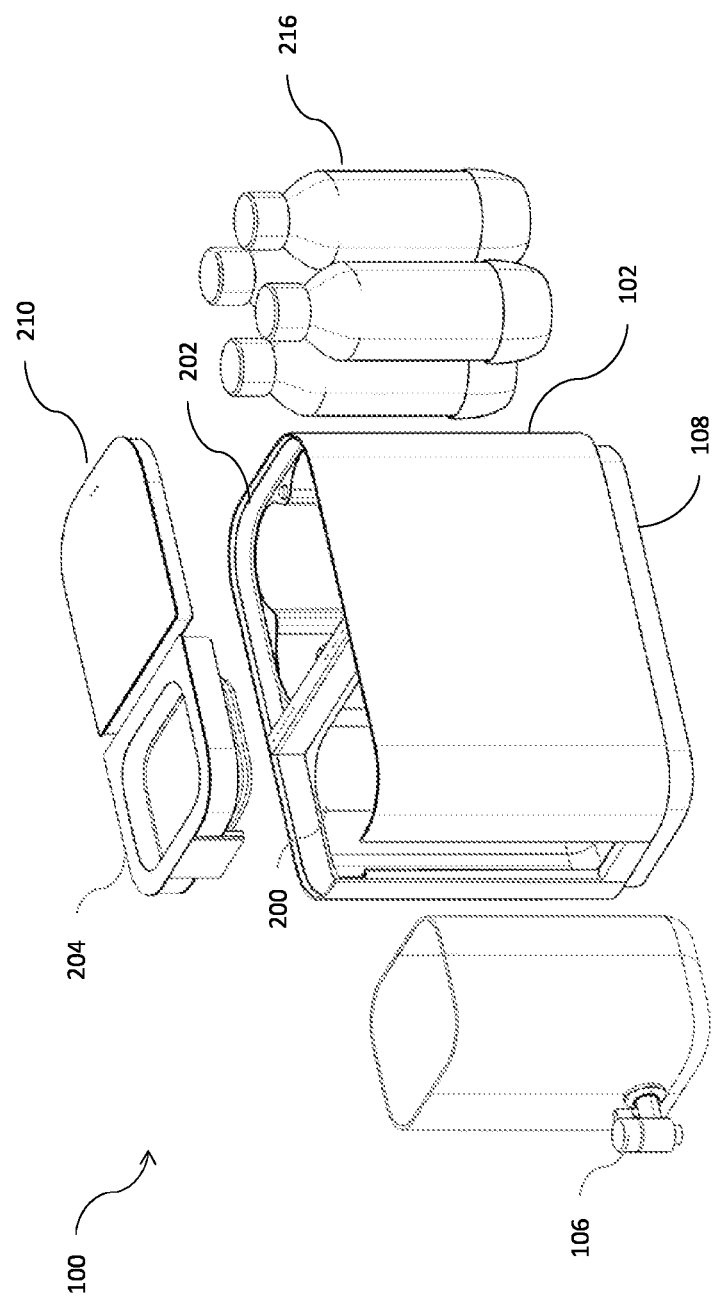
FIG. 2 is a perspective view of the separate components of the kombucha brewing device according to an embodiment.
Figure 3:
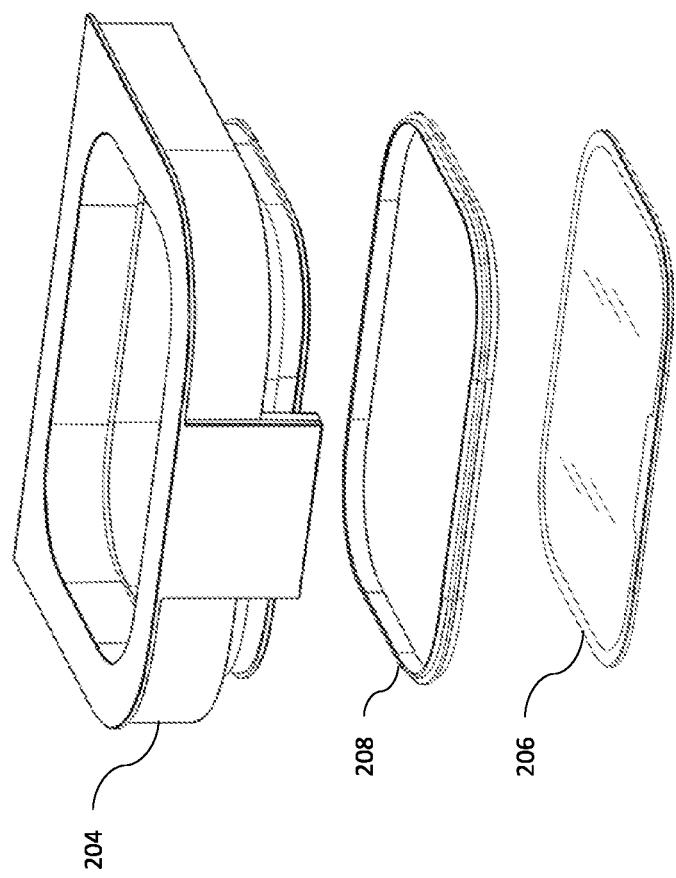
FIG. 3 is an exploded view of a first-stage fermentation portion lid compartment according to an embodiment.

FIG. 1 shows a kombucha brewing device 100 according to an embodiment. The device 100 may include a body 102, a lid 104, a spigot 106, and a base 108. FIG. 2 shows components of the device 100, which may be assembled into the device 100 for a brewing process. The body may include a first stage fermentation (F1) compartment 200 and a second stage fermentation (F2) compartment 202. The lid 104 may include an F1 portion 204 to fit over the F1 compartment 200. As shown in FIG. 3, the F1 portion 204 of the lid 104, may include a replaceable fabric filter disk 206 and a gasket 208, e.g., a silicone gasket, to provide a seal while the first stage kombucha ferments. Returning to FIG. 2, the lid 104 may also include an F2 portion 210, which may be a solid piece, to cover the F2 compartment 202.

A jar 212 including the spigot 106 for the first fermentation stage may be slid into the F1 compartment 200, which includes a groove 214 to accept the spigot. The jar may be made from a high-grade borosilicate glass jar, which is lighter and stronger than traditional soda glass used in many DIY kombucha home-brewing assemblies.

Figure 4:
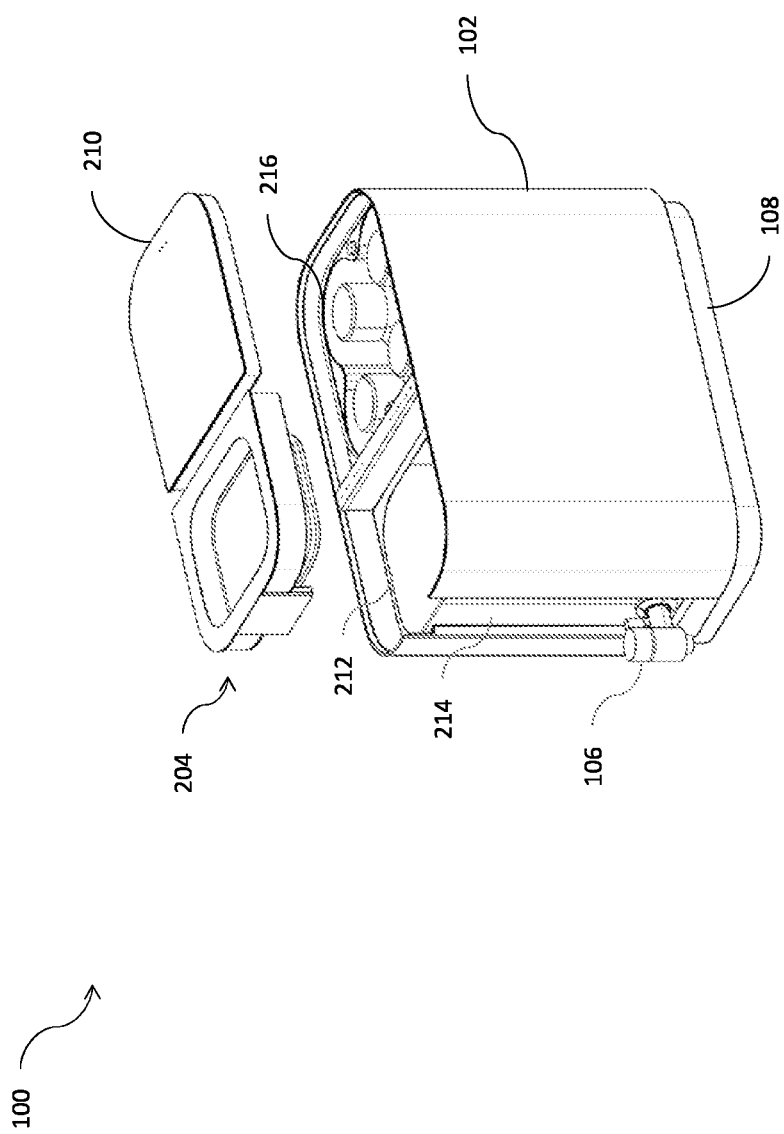
FIG. 4 is a perspective view of the separate components organized in the kombucha brewing device according to an embodiment.

Bottle(s) 216 for the second stage fermentation may be made from a lightweight plastic material, e.g., polyethylene terephthalate (PET), that can withstand high pressure from carbonation. A bottom portion 218 (shown in FIG. 5) may be attached to the bottom portions of the PET bottles to provide a flat surface for easier storage. The bottles 216 may be stored in the F2 compartment 202, which may be shaped to accommodate the bottles. Once the jar 212 and bottles 216 are stored in the device 100, as shown in FIG. 4, the lid 104 may be pressed and sealed onto the body 102 to create a compact, semi-automated kombucha brewing system (FIG. 1). The volume capacities of the jar and the bottles may correspond, making it easier for users to brew continuous batches.

Figure 5:
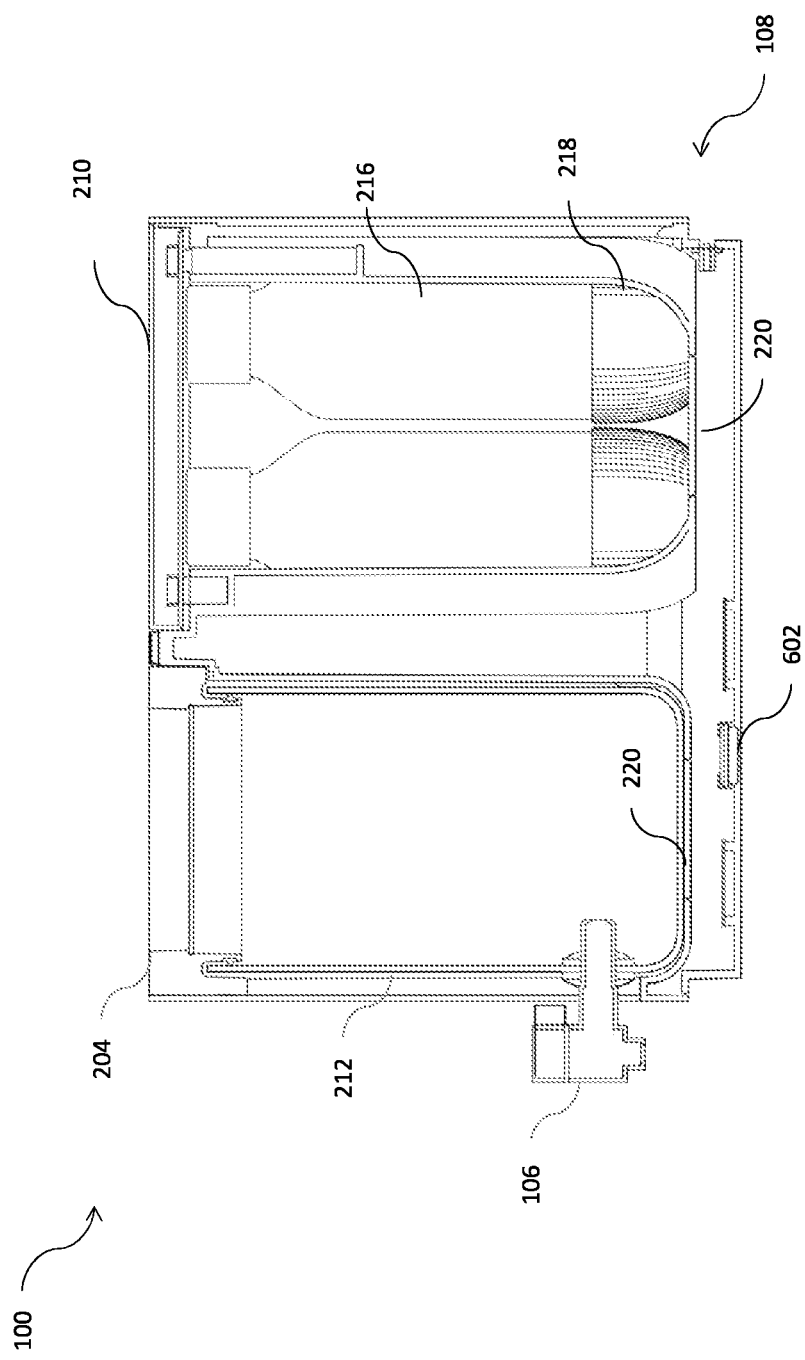
FIG. 5 is a sectional view of the device according to an embodiment.

FIG. 5 is a sectional view of the device 100. The base 108 and other portions of the device 100 may be injection molded plastic parts. Each compartment may include a heating element 220. Each compartment may be insulated. The insulation systems may include air, an electrically heated contained fluid, e.g., heated water pad(s), or a foamed-in-place insulation material, such as a urethane composition or blow-molded plastic, polystyrene, etc.

Figure 6:
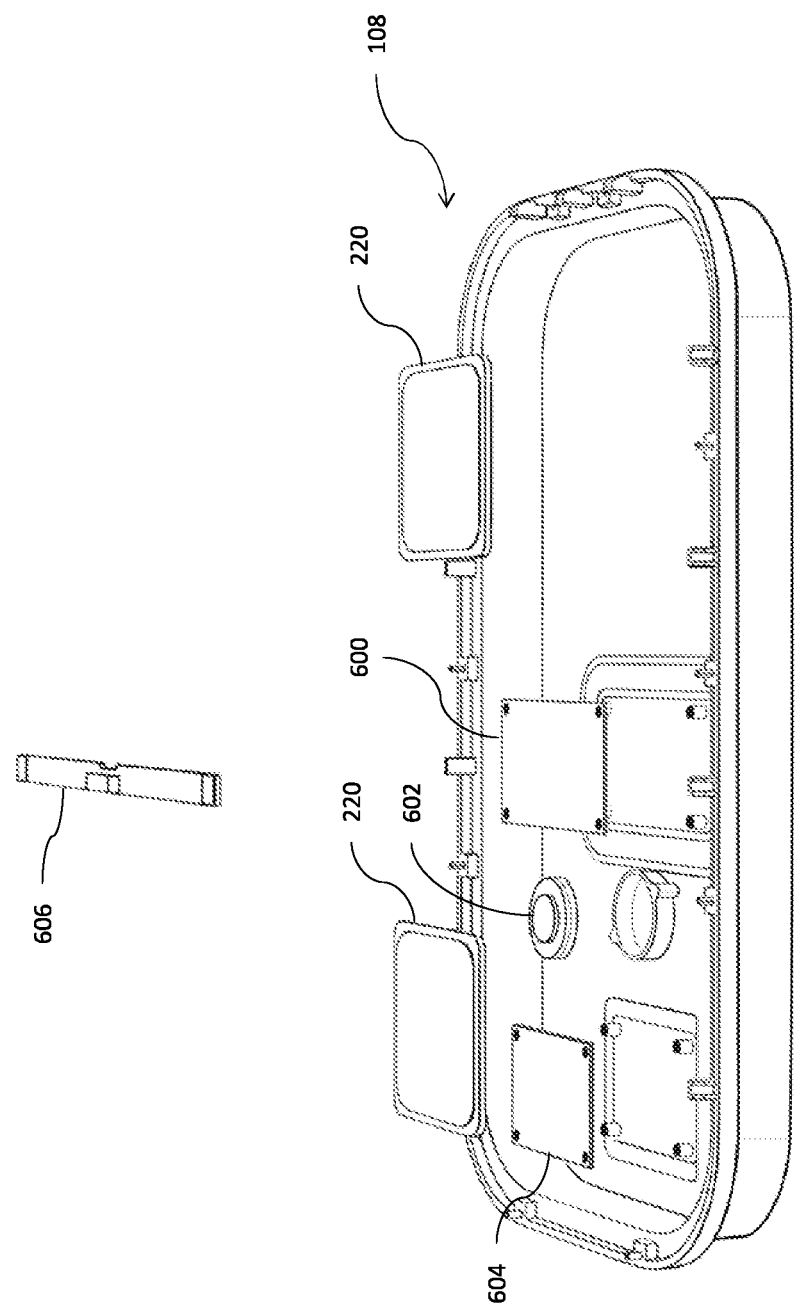
FIG. 6 is a perspective view of electronic components in the kombucha brewing device according to an embodiment.

FIG. 6 shows electronic components of the device 100. The device 100 may include a main printed circuit board assembly (PCBA) 600, one or more speakers 602, a PCBA 604 including a controller for the speaker(s), and light emitting diode (LED) PCBA 606 for controlling LED indicating lights. The base 108 may include the main PCBA 600, speaker(s) 602, speaker PCBA 604, LED PCBA 606, and the heating elements 220.

Figure 7:
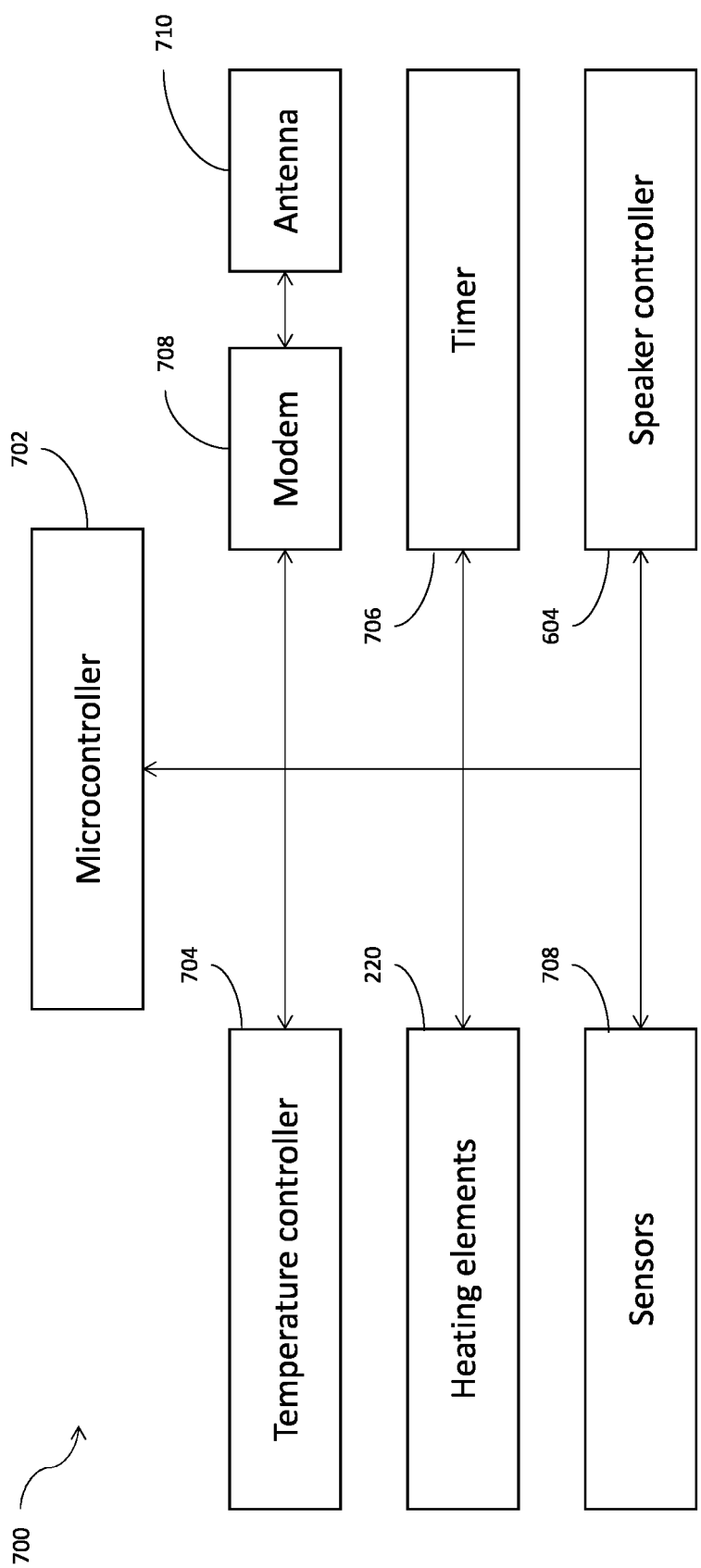
FIG. 7 is a block diagram showing electronic components and control elements of the kombucha brewing device according to an embodiment.

FIG. 7 shows a control system 700 for the device 100 according to an embodiment. The main PCBA 600 may include a microcontroller 702, a temperature controller 704, a timer 706, a modem 708 and antenna 710 for wireless communication with a user device.

Figure 8:
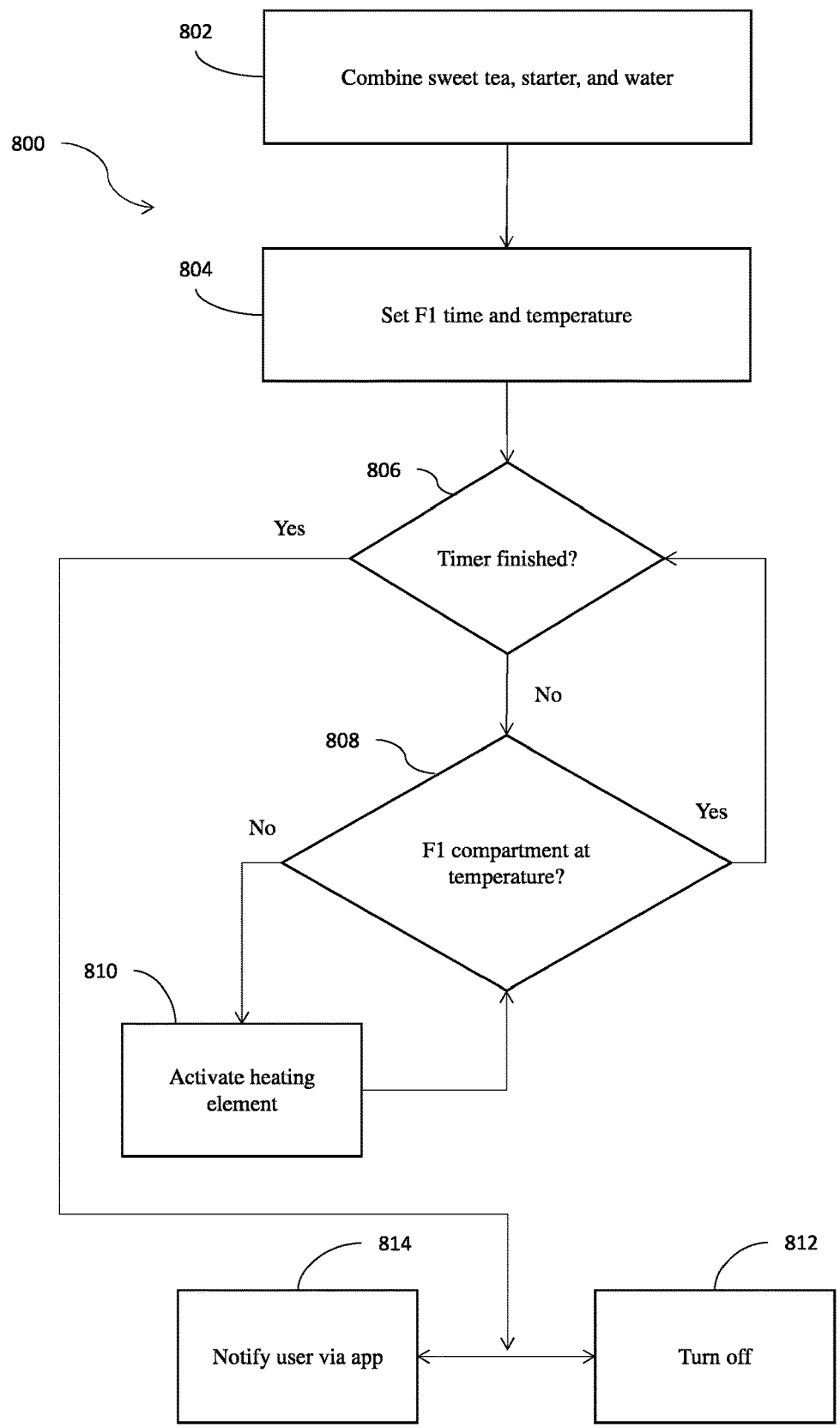
FIG. 8 is a flowchart describing a first fermentation (F1) brewing processing using the kombucha brewing device.

FIG. 8 is a flowchart of a method 800 for brewing kombucha in the device 100 according to an embodiment. To prepare for the first stage fermentation (F1), the user may first pour a desired sweet tea into the jar 212 and add in a starter kombucha (e.g., in a range of about 20%, and water (step 802). In an embodiment, the jar 212 may have about a 3 liter capacity, although other sizes may be used. As described above, the bottles 216 may have a total combined volume capacity substantially equaling that of the jar 212 to facilitate brewing continuous batches.

Figure 9:
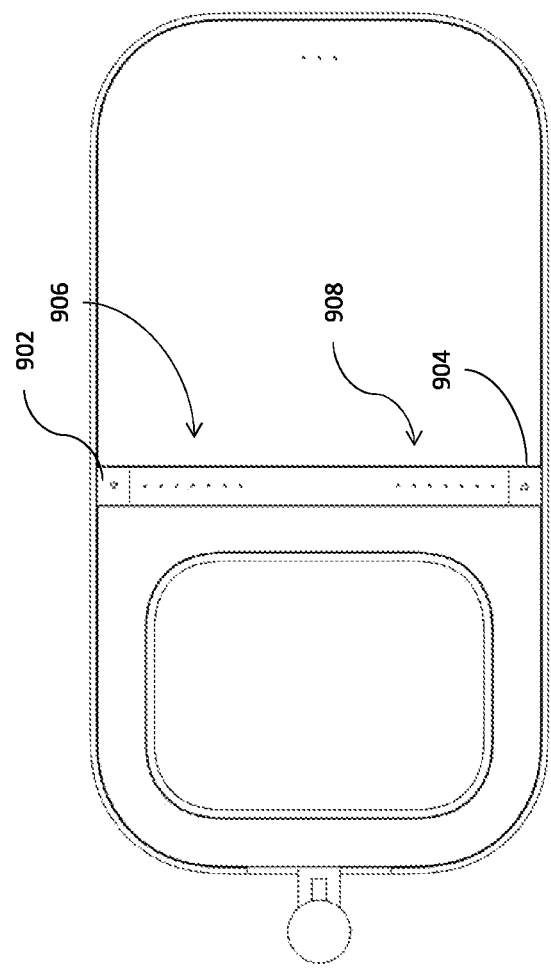
FIG. 9 shows timer control buttons and indicators on the lid according to different embodiments.

The user may then set a timer and a threshold brewing temperature or temperature range (if other than a default temperature/temperature range) (step 804). The user may set the time using control buttons 902, 904 on the device itself, as shown in FIG. 9. An F1 timer button 902 may be used to set the number of fermentation days, with F1 day indicator lights 906 indicating the initial set number of days. An F2 timer button 904 may be used to set the number of fermentation days, with F2 day indicator lights 908 indicating the initial set number of days. As each day expires, the indicator light for that day may turn off, giving the user an estimate of the end of the fermentation process at a glance. In an alternative embodiment, the lid 104 may include a control display, e.g., a touch sensitive screen and/or physical buttons, to set the timer and temperature.

During the time the timer is counting down the F1 brewing time (step 806), the brewing kombucha batch may be kept within a desired temperature range. The sensors 708 may include temperature sensors to monitor the temperatures of the F1 and F2 compartments. The temperature controller 704 may monitor the temperatures of the compartments, and if the temperature falls below a set lower threshold temperature, for example, 78° F., (step 808) the temperature controller 704 may turn on the appropriate heating element 220 for a certain amount of time or until the temperature is raised to certain upper threshold temperature, e.g., 79° F., at which point, the temperature controller 704 may turn of the heating element.

This process may be repeated until the timer counts down to the end of the scheduled brewing time. The microcontroller 702 may then turn off the system (step 810) and/or send a notification to the user via the modem 708 and antenna 710 (step 812), depending on the user's preference. In addition, the speaker 602 may be controlled to send out an audible notification for the end of the brewing process and other potentially useful notifications, such as "on", "add day", "timer finished", "off", etc.

Figure 10:
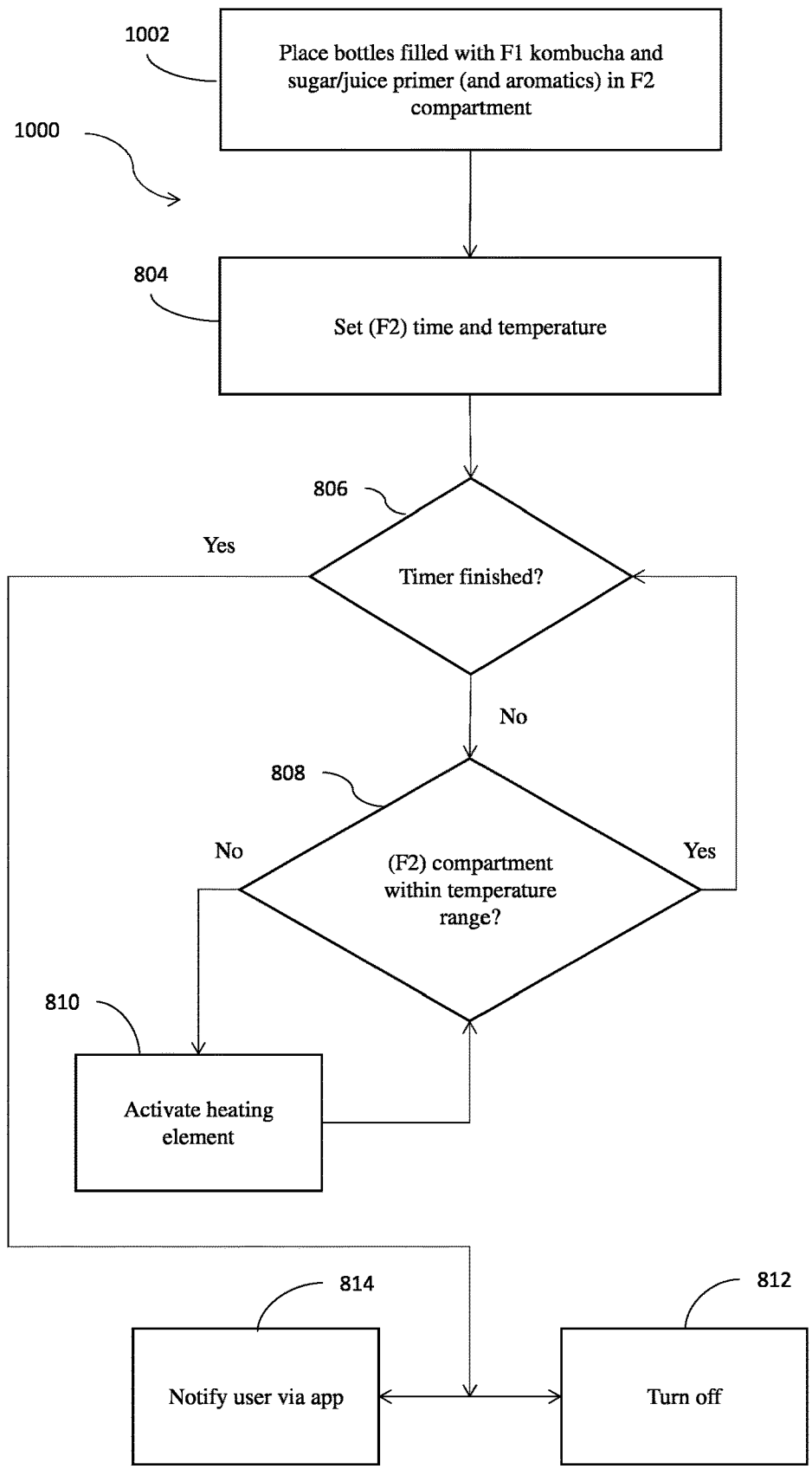
FIG. 10 is a flowchart describing a second fermentation (F2) brewing processing using the kombucha brewing device.

FIG. 10 is a flowchart of a method 1000 for the second stage brewing kombucha process in the device 100 according to an embodiment. The bottles 216 may be filled from the kombucha in the jar 212 after a successful first fermentation. The kombucha from the jar may be mixed inside or outside of the bottles with a sugar and/or fruit/fruit juice primer to promote carbonation, e.g., at a 10-20% ratio. Any desired aromatics, such as extracts, herbs, spices, may also be added at this point. The bottles may then be placed in the F2 compartment 202 (step 1002). The rest of F2 fermentation process may essentially follow that of the F1 fermentation process shown in FIG. 8. Once the F2 fermentation process is completed, the bottles may be placed in a refrigerator to cool, e.g., four hours or more.

In an embodiment, the user may monitor the progression of the fermentation processes using an application that may run on the user's smartphone or other networked device, e.g., a tablet, personal computer, laptop, etc. The modem in the device 100, may connect to the user's mobile device (or computer) through one or more network connections, e.g., telecommunication networks (3G, 4G, 5G, etc.), Wifi (IEEE 802.11), Bluetooth (IEEE 802.15), Zigbee (IEEE 802.15.4), Internet-of-Things. etc.

Figure 11:
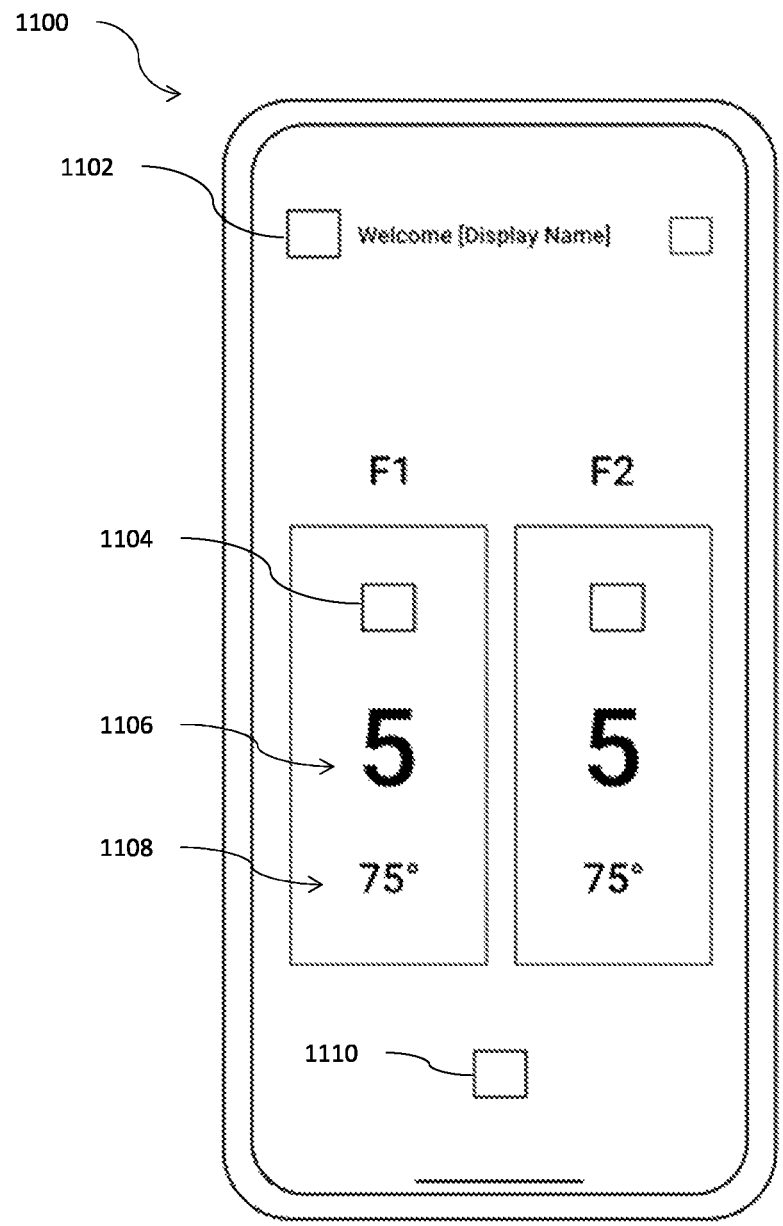
FIG. 11 shows a screen illustrating a monitoring feature on a mobile device according to an embodiment.

FIG. 11 shows an example of a "home" screen 1100 that may be shown on the user's mobile device. The home screen may include a menu/notifications icon 1102, a power on/off icon 1104, a "days remaining" icon 1106, container temperature icon 1108 (which may be shown in Fahrenheit or Celsius), and an Information/"How to" icon 1110.

Figure 12:
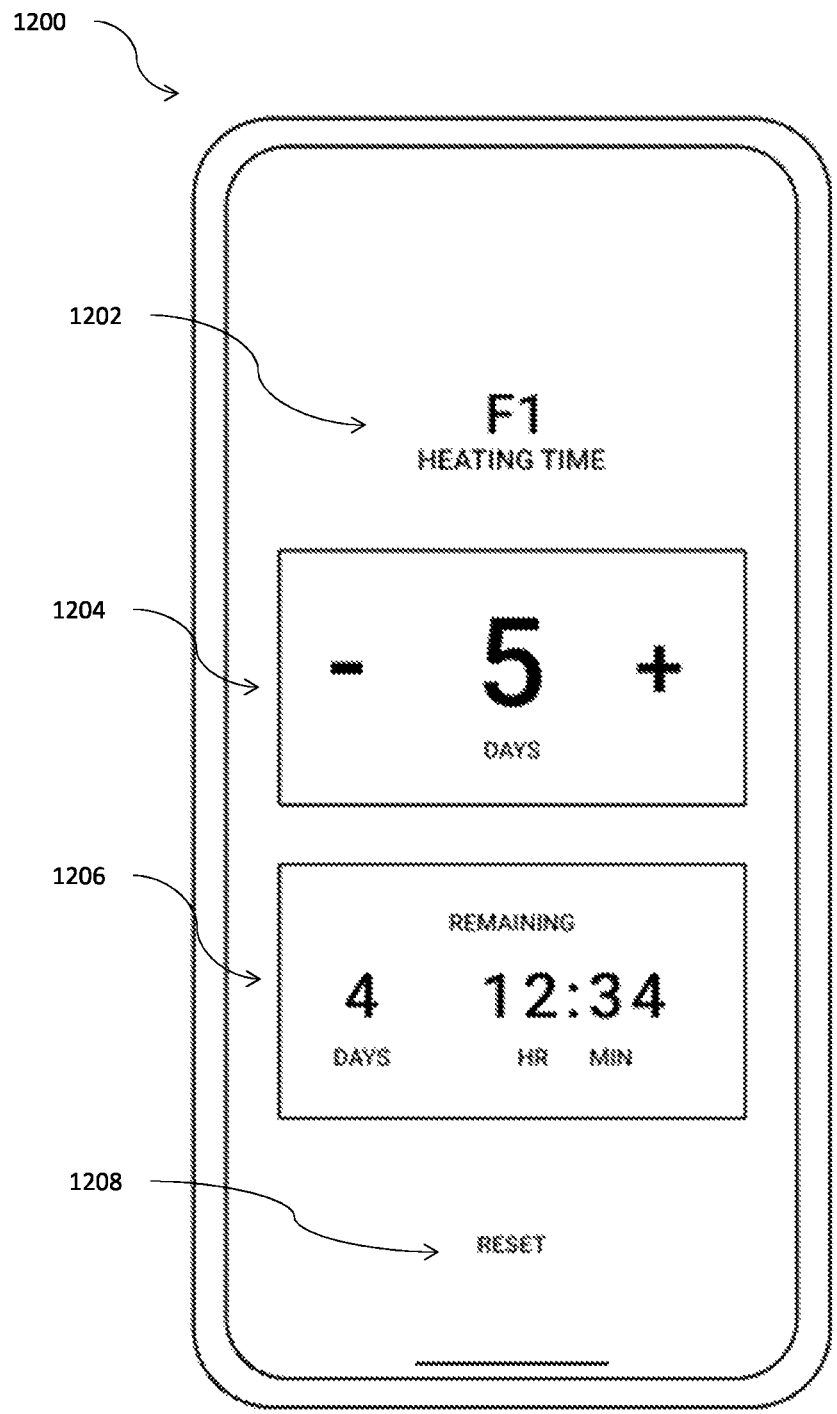
FIG. 12 shows a screen illustrating a timer control feature on a mobile device according to an embodiment.

FIG. 12 shows an example of a "set" screen 1200. The screen 1200 may have a field 1202 to identify the compartment (in this case F1), and add/subtract day field and virtual buttons 1204, a time remaining field 1206, and a "reset timer" virtual button 1208.

Figure 13:
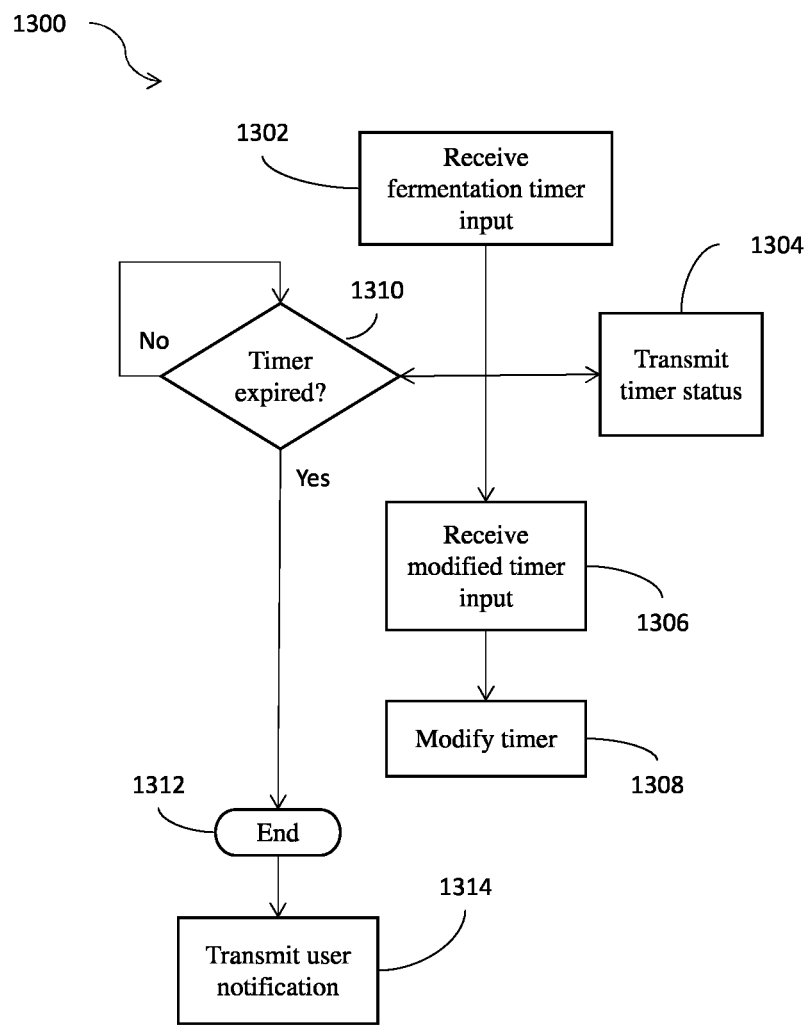
FIG. 13 is a flowchart describing a process for controlling the timing features of the device according to an embodiment.

FIG. 13 is a flowchart describing a process 1300 for controlling the timing features of the device 100. The user may enter the F1 fermentation time (step 1302), either via the lid input buttons or the user device. The kombucha brewing device 100 may update the user device regarding the timer status at a regular interval (step 1304). The user may change the timer setting (step 1306) as shown in FIG.

12, and the device 100 may update the timer setting (step 1308). The timer 706 consistently checks the expiration of time (step 1310). When the timer is finished, the process may end (step 1312), and the user may be notified (step 1314).

Figure 14:
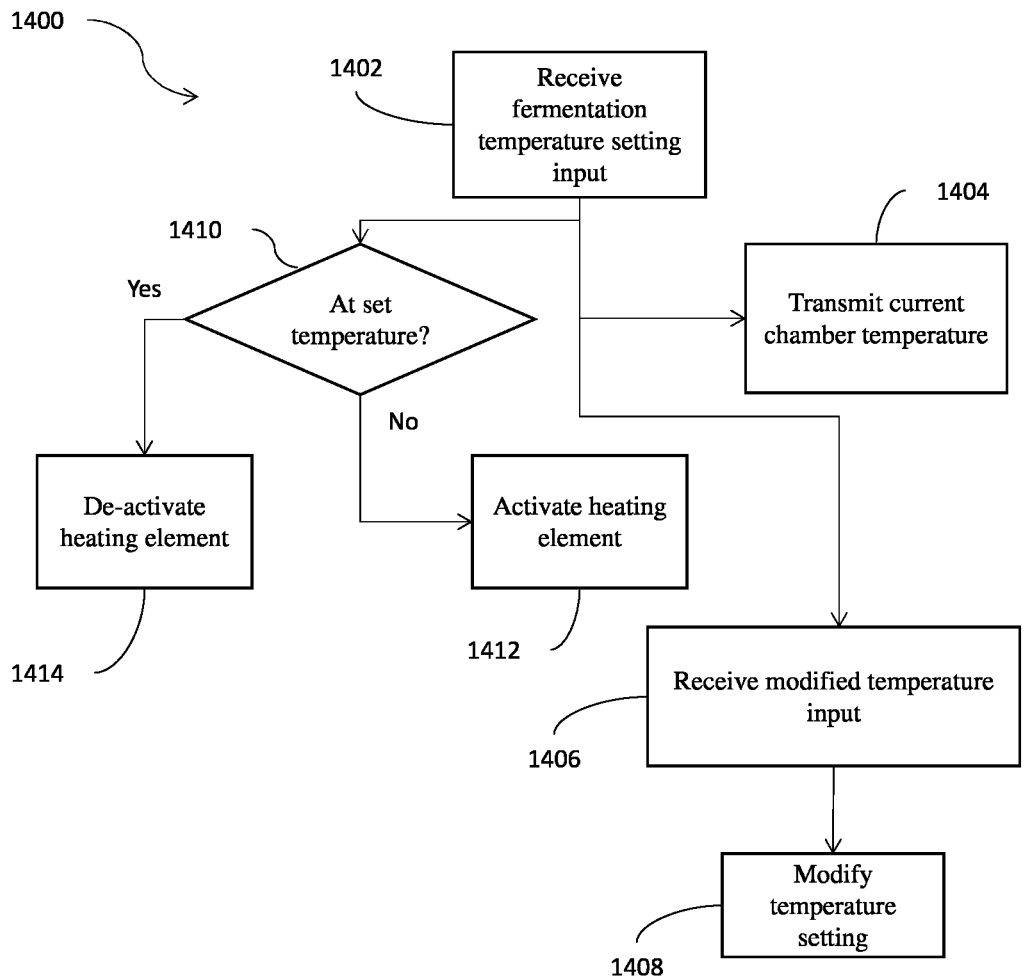
FIG. 14 is a flowchart describing a process for controlling the temperature features of the device according to an embodiment.

FIG. 14 is a flowchart describing a process 1400 for controlling the temperature features of the device 100. The user may enter the F1 fermentation temperature setting (step 1402), either via the lid input buttons or the user device. The kombucha brewing device 100 may update the user device regarding current chamber temperature at a regular interval (step 1404). The user may change the timer setting (step 1406) as shown in FIG. 12, and the device 100 may update the temperature setting (step 1408). The temperature controller 704 may consistently check the chamber temperature (step 1410). If the chamber temperature falls below a low threshold temperature, the temperature controller 704 may activate the chamber heating element 220 (step 1412). Once the chamber reaches an acceptable temperature, and the temperature controller 704 may de-activate the heating element (step 1414).

In an alternative embodiment, the F1 and F2 chambers may be rearranged, for example, separate, stacked, or side-by-side.

In another embodiment, pressure sensors may be included in the F1 chamber and/or on the lid of the bottles in the F2 chamber to further track the fermentation process. The information from the pressure sensors may be transmitted to the microcontroller and/or the user device.

Figure 15:
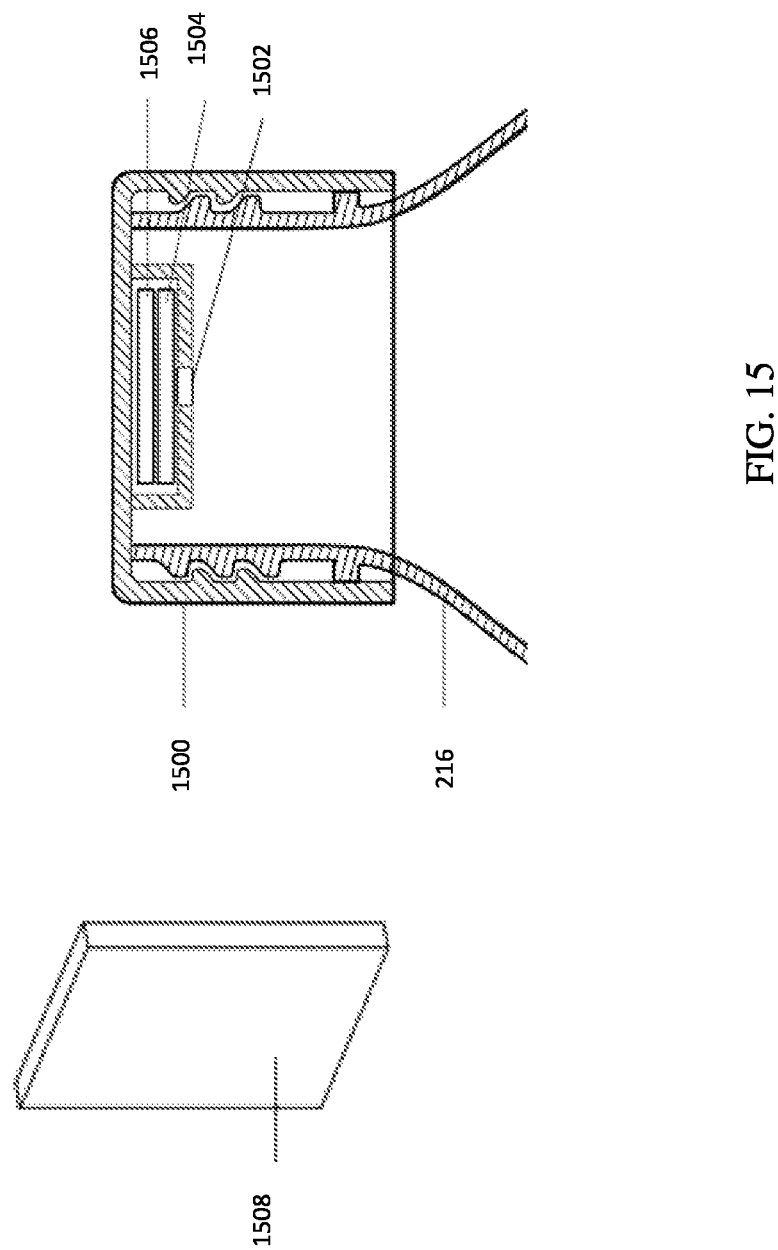
FIG. 15 is a sectional view of a bottle cap including a pressure sensor according to an embodiment.

For example, in an embodiment, the bottle cap 1500 for each bottle 216 may include a pressure sensor 1502 that can measure the pressure inside the bottle, as shown in FIG. 15. This pressure data can be sent to the device and then onto the cloud network where a user can view this data from the mobile app. As the pressure builds in the bottle 216 from carbon dioxide ($CO_2$) production during the secondary fermentation process, the sensor 1502 may track the pressure level at the cap.

The stack up of the electronics in the cap 1500 may include the sensor 1502 and a microchip and/or PCBA 1504 and may be powered with a battery and/or by a passive RFID antenna 1506. The bottle cap microchip/PCBA may connect with the microcontroller 702 via an antenna/reader 1508 through wireless and/or wired connection.

The pressure sensor 1502 may be included in the sensors 708 shown in FIG. 7. The control system 700 may notify the user though the mobile app of the current pressure and/or when a certain pressure threshold is reached.

The foregoing method descriptions and diagrams/figures are provided merely as illustrative examples and are not intended to require or imply that the operations of various aspects must be performed in the order presented. As will be appreciated by one of skill in the art, the order of operations in the aspects described herein may be performed in any order. Words such as "thereafter," "then," "next," etc. are not intended to limit the order of the operations; such words are used to guide the reader through the description of the methods and systems described herein. Further, any reference to claim elements in the singular, for example, using the articles "a," "an," or "the" is not to be construed as limiting the element to the singular.

Various illustrative logical blocks, modules, components, circuits, and algorithm operations described in connection with the aspects described herein may be implemented as electronic hardware, computer software, or combinations of both. To clearly illustrate this interchangeability of hardware and software, various illustrative components, blocks, modules, circuits, operations, etc. have been described herein generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described herein may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described herein. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. A brewing device comprising:
a first brewing chamber;
a second brewing chamber;
a lid to cover the first brewing chamber and the second brewing chamber;
a base including:
   a first heating element and a first temperature sensor associated with the first chamber, and
   a second heating element and a second temperature sensor associated with the second chamber,
a temperature controller in communication with the first and second temperature sensors, the temperature controller operative to maintain the first chamber within a first temperature range and maintain the second chamber within a second temperature range by monitoring information from the temperature sensors and activating and de-activating the heating elements; and
a timer operative to de-activate the first heating element in response to a first brewing time expiring and to de-activate the second heating element in response to a second brewing time expiring.

2. The brewing device of claim 1, further comprising:
a modem and associated antenna; and
a controller in communication with the temperature controller, timer, and modem, the controller operative to transmit and receive information from a user device.

3. The brewing device of claim 2, wherein the controller is operative to:
transmit status information from the temperature sensors and timer to the user device.

4. The brewing device of claim 2, wherein the controller is operative to:
receive control information for the timer and temperature controller from the user device.

5. The brewing device of claim 1, further comprising:
a speaker; and
a speaker controller operative to control the speaker to provide audible notifications.

6. The brewing device of claim 1, further comprising:
a plurality of light indicators; and
a light indicator controller operative to control the plurality of light indicators into an on or off status to provide visual notifications.

7. The brewing device of claim 1, wherein the second fermentation chamber is shaped to accommodate a plurality of bottles.

8. The brewing device of claim 7, further comprising one or more pressure sensors to monitor the pressure in one or both of the first fermentation chamber and one or more bottles in the second fermentation chamber.

9. The brewing device of claim 1, wherein the first fermentation chamber and the second fermentation have approximately the same volume.

10. The brewing device of claim 1, wherein the lid comprises a first portion to cover the first fermentation chamber and a second portion to cover the second fermentation chamber.

11. The brewing device of claim 10, wherein the first lid portion comprises:
a gasket; and
a replaceable fabric insert.

12. The brewing device of claim 1, further comprising a first fermentation vessel shaped for insertion into the first fermentation chamber and including a spout.

* * * * *